US011763027B1

(12) United States Patent
Clark et al.

(10) Patent No.: US 11,763,027 B1
(45) Date of Patent: *Sep. 19, 2023

(54) RULES-BASED DATA ACCESS SYSTEMS AND METHODS

(71) Applicant: United Services Automobile Association (USAA), San Antonio, TX (US)

(72) Inventors: Larry Wayne Clark, San Antonio, TX (US); Patricia A. Rosas, San Antonio, TX (US); Mark Shafer, San Antonio, TX (US); Linda Giessel King, San Antonio, TX (US); Steven Wayne Meier, Jr., San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/681,682

(22) Filed: Feb. 25, 2022

Related U.S. Application Data (63) Continuation of application No. 16/575,287, filed on Sep. 18, 2019, now Pat. No. 11,295,033, which is a continuation of application No. 15/820,932, filed on Nov. 22, 2017, now Pat. No. 10,467,430, which is a continuation of application No. 14/594,836, filed on Jan. 12, 2015, now Pat. No. 9,830,473, which is a continuation of application No. 13/717,392, filed on Dec. 17, 2012, now Pat. No. 8,935,804.

(60) Provisional application No. 61/576,170, filed on Dec. 15, 2011.

(51) Int. Cl.
G06F 21/62 (2013.01)
G06F 16/954 (2019.01)

(52) U.S. Cl.
CPC ........ *G06F 21/6245* (2013.01); *G06F 16/954* (2019.01)

(58) Field of Classification Search
CPC ............................ G06F 16/954; G06F 21/6245
USPC ....................................................... 726/1, 27
See application file for complete search history.

(56) References Cited

U.S. PATENT DOCUMENTS 6,158,010 A 12/2000 Moriconi
6,947,897 B2 9/2005 Lortscher et al.
(Continued)

FOREIGN PATENT DOCUMENTS

WO 2001033936 A2 5/2001

OTHER PUBLICATIONS

Blobel, Bern, "Authorisation and Access Control for Electronic Health Record System", International Journal of Medical Informatics, 2004, Issue 73, pp. 251-257.

*Primary Examiner* — Amare F Tabor
(74) *Attorney, Agent, or Firm* — Perkins Coie LLP (57) ABSTRACT

Methods and systems for rules-based data access are described. In some embodiments, a request for access to customer data by a requesting entity is received; the data is categorized; the person's preferences with respect to allowing access to data are compiled; a requesting entity is determined; and the providing entity that collected each requested data item is determined. Data shareability rules are evaluated based on the policies that regulate the access of the customer data and the requesting entity, and the customer data is provided to the requesting entity according to the evaluation.

20 Claims, 7 Drawing Sheets

(56) References Cited

U.S. PATENT DOCUMENTS

| | | | |
|---|---|---|---|
| 7,457,609 B2 * | 11/2008 | Cai | H04L 41/5054 455/519 |
| 7,483,908 B2 | 1/2009 | Sellger et al. | |
| 7,603,705 B2 | 10/2009 | Roy | |
| 7,707,413 B2 | 4/2010 | Lunt | |
| 7,805,415 B1 | 9/2010 | Flesher | |
| 7,809,791 B2 | 10/2010 | Schwartz et al. | |
| 7,853,786 B1 | 12/2010 | Fultz et al. | |
| 7,987,197 B2 * | 7/2011 | Margolus | G06F 16/2358 707/783 |
| 7,997,485 B2 | 8/2011 | Flake et al. | |
| 8,078,515 B2 | 12/2011 | John | |
| 8,185,737 B2 | 5/2012 | Isaacs | |
| 8,250,096 B2 | 8/2012 | Su et al. | |
| 8,443,115 B2 | 5/2013 | Koltzin | |
| 8,484,704 B2 | 7/2013 | Chavez et al. | |
| 8,544,057 B2 | 9/2013 | Bocking | |
| 8,606,746 B2 | 12/2013 | Yeap et al. | |
| 8,612,891 B2 | 12/2013 | Singh et al. | |
| 8,627,506 B2 | 1/2014 | Vera | |
| 8,631,247 B2 | 1/2014 | O'Loughlin | |
| 8,688,781 B2 | 4/2014 | Taleb | |
| 8,689,311 B2 | 4/2014 | Blinn et al. | |
| 8,738,749 B2 * | 5/2014 | Brock | H04L 63/20 709/224 |
| 8,776,177 B2 | 7/2014 | Ferren et al. | |
| 8,837,718 B2 | 9/2014 | Lauter et al. | |
| 8,914,441 B2 | 12/2014 | Quintuna | |
| 8,935,804 B1 | 1/2015 | Clark et al. | |
| 8,978,147 B2 | 3/2015 | Chaganti et al. | |
| 8,984,647 B2 | 3/2015 | Sandoval | |
| 9,043,935 B2 | 5/2015 | Morris | |
| 9,063,943 B1 | 6/2015 | Smith | |
| 9,317,712 B2 | 4/2016 | Karaoguz | |
| 9,727,751 B2 | 8/2017 | Oliver | |
| 9,830,473 B1 | 11/2017 | Clark et al. | |
| 10,467,430 B1 | 11/2019 | Clark et al. | |
| 11,295,033 B1 | 4/2022 | Clark et al. | |
| 2004/0107342 A1 | 6/2004 | Pham | |
| 2006/0225138 A1 | 10/2006 | Toyohara et al. | |
| 2006/0236363 A1 | 10/2006 | Heard | |
| 2007/0006294 A1 | 1/2007 | Hunter | |
| 2007/0240226 A1 | 10/2007 | Song et al. | |
| 2008/0027939 A1 | 1/2008 | Chalasani et al. | |
| 2008/0184334 A1 | 7/2008 | Hebert | |
| 2008/0301760 A1 | 12/2008 | Lim | |
| 2009/0037594 A1 | 2/2009 | Sever | |
| 2009/0070852 A1 | 3/2009 | Chijiwa | |
| 2009/0113540 A1 | 4/2009 | Chandwani | |
| 2009/0326980 A1 | 7/2009 | Nolan et al. | |
| 2009/0282457 A1 | 11/2009 | Govindavajhala | |
| 2010/0005518 A1 * | 1/2010 | Tirpak | H04L 67/306 726/6 |
| 2010/0095365 A1 | 4/2010 | Hsu et al. | |
| 2010/0175112 A1 | 7/2010 | Loeb et al. | |
| 2010/0185871 A1 | 7/2010 | Scherrer et al. | |
| 2010/0191612 A1 | 7/2010 | Raleigh | |
| 2010/0299717 A1 | 11/2010 | Nasirifard et al. | |
| 2012/0222133 A1 | 8/2012 | Kidron | |
| 2012/0331566 A1 | 12/2012 | Lection et al. | |
| 2013/0080520 A1 | 3/2013 | Kiukkonen et al. | |

* cited by examiner

RULES-BASED DATA ACCESS SYSTEMS AND METHODS

CROSS-REFERENCES

This application is a continuation of U.S. patent application Ser. No. 16/575,287, filed Sep. 18, 2019, now allowed, which is a continuation of U.S. patent application Ser. No. 15/820,932, filed Nov. 22, 2017, entitled "RULES-BASED DATA ACCESS SYSTEMS AND METHODS," issued as U.S. Pat. No. 10,467,430 on Nov. 5, 2019, which is a continuation of U.S. patent application Ser. No. 14/594,836, filed on Jan. 12, 2015, entitled "RULES-BASED DATA ACCESS SYSTEMS AND METHODS," issued as U.S. Pat. No. 9,830,473 on Nov. 28, 2017, which is a continuation of U.S. patent application Ser. No. 13/717,392, filed Dec. 17, 2012, entitled "RULES-BASED DATA ACCESS SYSTEMS AND METHODS," issued as U.S. Pat. No. 8,935,804 on Jan. 13, 2015, which claims the benefit of U.S. Provisional Application No. 61/576,170, filed Dec. 15, 2011, entitled "RULES-BASED DATA ACCESS SYSTEMS AND METHODS," all of which are hereby incorporated by reference for all purposes in their entireties.

TECHNICAL FIELD

Various embodiments of the present invention generally relate to rules-based data access systems and methods. More specifically, various embodiments of the present application relate to systems and methods for allowing access to data in compliance with various policies, and demonstrating compliance with the applicable policies.

BACKGROUND

Companies collect data related to individuals for various purposes. For example, companies may require a person to provide certain personal information to provide services, complete transactions, target advertising, accept job applications, and hire employees. In some cases, with or without the person's approval, companies share data with other entities such as affiliates or third parties to create efficiencies, increase accuracy in the data, and provide a better overall experience for the customer.

In recent years, businesses have set standards and entered into contracts that set or outline obligations and restrictions, and legislators have enacted various laws and regulations relating to accessing or sharing data, due in part to concerns about privacy and identity theft. The various laws, contracts, and regulations governing data sharing can apply separately or in concert, increasing complexity, making it difficult to determine what data may be accessed or shared, and if the data may be accessed or shared, under what circumstances it is legal or appropriate. Additionally, the consequences for violating the standards or regulations may be high. For example, allowing access to such information illegally or inappropriately may result in potential liability or civil fines, disparaged reputation, customer dissatisfaction, and loss of business. Therefore, instead of risking noncompliance with the law or business standards, many companies choose not to share data, even when circumstances permit allowing access under the governing standards or regulations. An additional burden for companies is demonstrating to officials that any data shared with or accessed by affiliates or third parties complies with the applicable regulations or standards.

SUMMARY

Various embodiments of the present invention generally relate to rules-based data access systems and methods. The application describes a method including receiving a request for access to customer data from a requesting entity; categorizing the customer data based on a type of the customer data and policies that regulate the access to the customer data; compiling customer preferences relating to the access of the customer data; determining the requesting entity; determining a providing entity, wherein the providing entity collected the customer data; evaluating data shareability rules based on the policies that regulate the access of the customer data, the customer preferences, the requesting entity, and the providing entity; and providing the customer data to the requesting entity according to the evaluation.

In some embodiments, the policies include government regulations, business, protocols, and/or contractual restrictions.

Evaluating the data shareability rules may include classifying at least a portion of the customer data as conditionally shareable, wherein the customer data categorized as conditionally shareable comprises data that can be accessed by the requesting entity when the customer preferences indicate that the customer consents.

Evaluating the data shareability rules may include classifying at least a portion of the data as prohibited from sharing, wherein the customer data categorized as prohibited from sharing data comprises data that cannot be accessed regardless of the customer preferences.

Evaluating the data shareability rules may include classifying at least a portion of the data as shareable regardless of consent, wherein the customer data categorized as shareable regardless of consent comprises data that can be accessed regardless of the customer preferences.

In some embodiments, no customer preferences are compiled, and the data shareability rules are further based on default customer preferences. In other embodiments, the customer preferences include a global consent to allowing access, a global denial of allowing access, or are made on a case-by-case basis.

The requesting entity may be determined based on at least one of the following: a user, a servicing application, or an organizational entity associated with the request. The user may include an employee having qualifications.

In some embodiments, at least two providing entities are determined, the evaluation of the customer data permits access by the requesting entity, the customer data accessed from the at least two providing entities is conflicting, and the method further comprises recommending the customer data based on a reliability of the data, where the reliability of the data is determined at least in part by a source of the data.

The method may include demonstrating compliance with applicable laws, including by providing an auditable template. The method may include demonstrating compliance with applicable laws, including by providing an auditable template.

In some embodiments, the requesting entity is permitted access to the data when the requesting entity is the same as the providing entity regardless of the customer preferences. In some embodiments, at least a portion of the customer data is provided to the requesting entity.

In other embodiments, the system is described including one or more processors; and computer-readable code that programs the one or more processors to: receive, from a requesting entity, a request for access to customer data; categorize the customer data based on a type of the customer data and policies that regulate the access of the customer data; wherein the policies comprise government regulations, business protocols, and contractual restrictions; compile customer preferences relating to the access of the customer data, wherein customer preferences are based on an identity of the requesting entity; determine the requesting entity based on at least one of the following: a user, a servicing application, or an organizational entity associated with the request; evaluate data shareability rules based on the policies that regulate the access of the customer data, the customer preferences, the requesting entity, and the providing entity to evaluate shareability of the customer data for the requesting entity, wherein evaluations of the customer data comprise conditionally shareable, prohibited from sharing, and shareable, wherein the customer data evaluated as conditionally shareable comprises data that can be accessed by the requesting entity with the consent of the customer, wherein the customer data evaluated as prohibited from sharing data comprises data that cannot be accessed regardless of the consent of the customer, wherein the customer data evaluated as shareable comprises data that can be accessed without the consent of the customer; wherein when no customer preferences are compiled, the data access rules are further based on default customer preferences; provide access to the requesting entity according to the evaluated shareability of the customer data; and demonstrate compliance with applicable laws, wherein the computer-readable code that programs the one or more processors to demonstrate compliance with applicable laws further programs the one or more processors to provide an auditable template.

In other embodiments, a non-transitory machine-readable medium is described. The non-transitory machine-readable medium has machine executable instructions stored thereon that, when executed by one or more processors, direct the one or more processors to perform a method comprising: receiving, from a requesting entity, a request for access to customer data; categorizing the customer data based on a type of the customer data and policies that regulate the access of the customer data, wherein the policies comprise government regulations, business protocols, and contractual restrictions; compiling customer preferences relating to the access of the customer data, wherein the customer preferences are based on an identity of the requesting entity; determining the requesting entity based at least in part on one of the following: a user, a servicing application, or an organizational entity associated with the request; evaluating data access rules based on the policies that regulate the access of the customer data, the customer preferences, the requesting entity, and the providing entity to evaluate shareability of the customer data for the requesting entity, wherein evaluations of the customer data comprises conditionally shareable, prohibited from sharing, and shareable, wherein the customer data evaluated as conditionally shareable comprises data that can be accessed by the requesting entity with the consent of the customer, wherein the customer data evaluated as prohibited from sharing data comprises data that cannot be accessed regardless of the consent of the customer, wherein the customer data evaluated as shareable comprises data that can be accessed without the consent of the customer; wherein when no customer preferences are compiled, the data access rules are further based on default customer preferences; providing access to the requesting entity according to the evaluation; and demonstrating compliance with applicable laws, wherein demonstrating compliance with applicable laws comprises providing an auditable template.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention are directed to methods and systems for allowing access to data. More specifically, various embodiments of the present application relate to methods and systems for allowing access to data in compliance with rules established by an organization based on laws, regulations, contracts or standards, within an organization or external to an organization, and demonstrating the compliance. In this disclosure, "sharing" data has an equivalent meaning to "allowing access" to data. In this disclosure, many examples are directed specifically to a customer organization in determining whether customer data may be accessed by a requesting entity. However, it should be understood that the methods and systems described may be applied to any organization in determining whether data relating to any person may be shared with a requesting entity. For example, the methods and systems described may be applied to organization making determinations regarding whether data relating to an employee may be shared with a requesting entity.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention provide methods and systems for allowing access to data relating to a person. The methods and systems may take into consideration various rules regarding sharing data with entities within or outside of the organization. Because there are many rules regarding what data may be accessed by affiliates or third parties, organizations may resort to refusing to share any data, even data that can legally be accessed, rather than risk being noncompliant. While making a straightforward non-sharing rule ensures compliance, it also results in inefficiencies. For example, the same data may be collected multiple times, creating potential inaccuracies from re-entering data, inconsistencies in collected data, and inefficiencies from both the customer and organizational standpoints. Thus, rather than simply apply a policy of no sharing of data, using the methods and systems described in this disclosure, an organization can allow access to data appropriately by applying rules that consider the categorization of the data, the preferences chosen by the person, the entity requesting and/or accessing the data, the entity that provided the data, the purpose for which the data is being requested, and the laws, regulations, or contracts governing the sharing or use of the data. In addition, it is equally important for an organization to be able to prove compliance with various laws, regulations, and contract restrictions, should a regulator or other official ask. Thus, the disclosure further provides a method and system for demonstrating compliance. For example, compliance may be demonstrated by illustrating how decisions regarding access to data are made.

Figure 1:
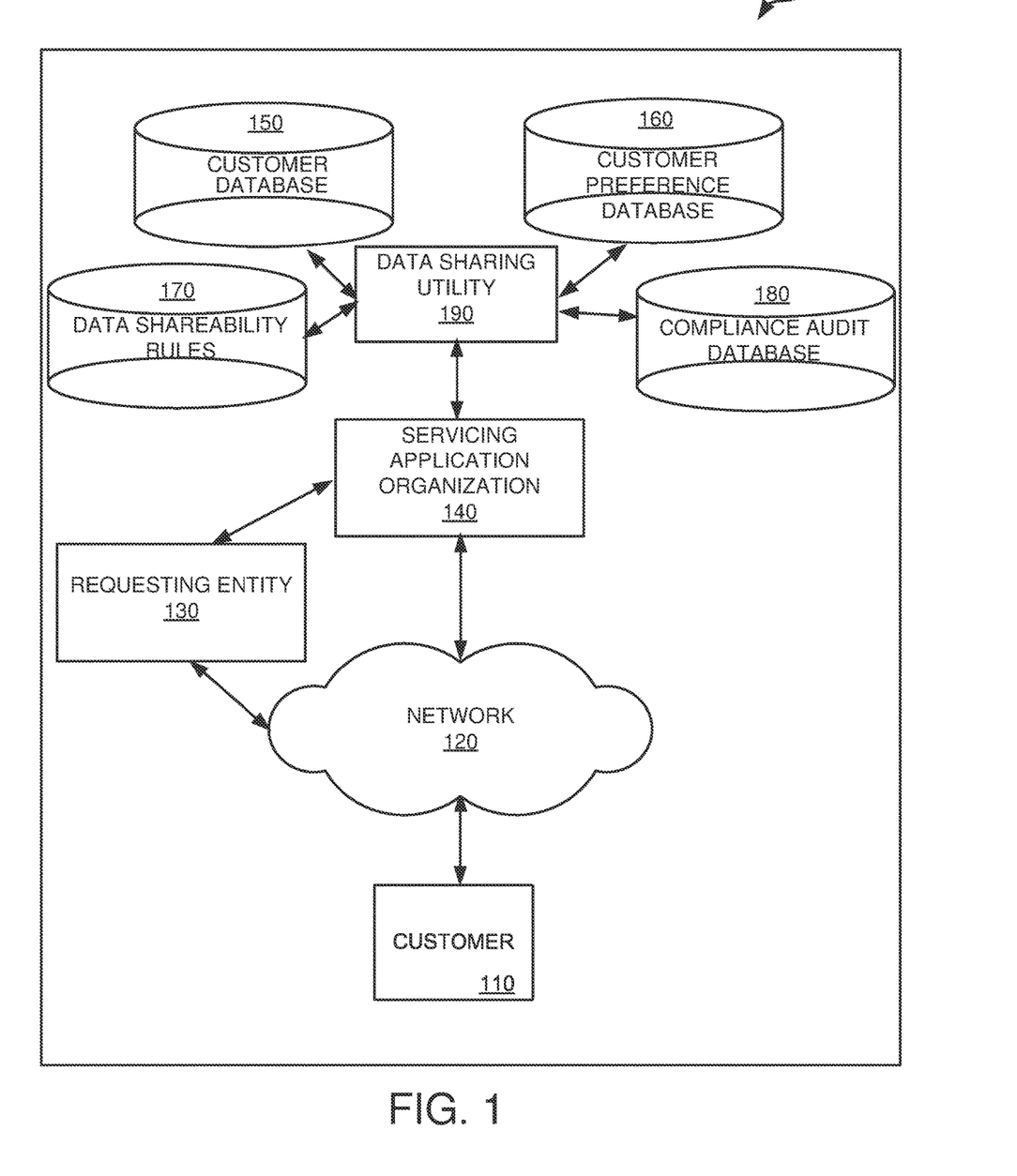
FIG. 1 illustrates an example of an operating environment in which some embodiments of the present invention may be utilized.

Having described embodiments of the present invention generally, attention is directed to FIG. 1, which illustrates an example of a system 100 in which some embodiments of the present disclosure may be utilized. The embodiments illustrated in FIG. 1 allow organizations to navigate rules governing data access, and to demonstrate compliance with applicable rules for any data that is accessed or shared.

Operating environment 100 includes customer 110, network 120, requesting entity 130, servicing application organization 140, customer database 150, customer preference database 160, data shareability rules 170, compliance audit database 180, and data sharing utility 190. The embodiments of the present invention illustrated in FIG. 1 allow an organization to collect customer data through various points of interaction, receive a request for customer data from a requesting entity, access databases, synthesize the data, and determine if the data can be shared with the requesting entity. Servicing application organization 140 and requesting entity 130 may interact with customer 110 through various points of interaction, such as, but not limited to, telephones, interactive voice response systems dedicated terminals such as a kiosk, ATM networks, mobile devices, personal computers or a point of sale devices. A customer 110 may communicate through these or other points of interaction while interacting with requesting entity 130.

These points of interaction can include mechanisms for communicating information through network 120 to servicing application organization 140 or requesting entity 130 and may run one or more applications or clients that allow a user to interact with the requesting entity or the servicing application organization 140. As an alternative, customer 110 can communicate in person with servicing application organization 140 or requesting entity 130.

Requesting entity 130 may be affiliated with servicing application organization 140 or requesting entity 130 may be an unrelated entity. For purposes of this disclosure, the term "affiliated entity" refers to any entity that directly or indirectly, legally or beneficially, owns, is owned, or is under common ownership with an organization's ultimate parent. Affiliated entities also refer to separate divisions within the same organization. The term "third party entity" refers to any entity that is not an affiliated entity. A third party entity may have a contractual relationship with the organization, such as a service provider for servicing application organization 140. The term "organizational entity" includes any type of entity. Thus, a third party entity may provide cafeteria services or health care services for members or customers of servicing application organization 140, whereas an affiliated entity may be the mortgage division of the organization or a mortgage organization owned by parent organization. In this example, the cafeteria services provider, health care provider, and the mortgage division are organizational entities.

Customer 110 is a customer or potential customer who uses, or may use, servicing applications from the servicing application organization 140. For example, a customer may use a consumer loan application or a life insurance application. In some embodiments, customer 110 is a requesting entity. A requesting entity is determined by a user, servicing application, and/or the organizational entity associated with the request. The requesting entity accesses the data, if permitted, based on the rules. In some embodiments, other factors may be used to determine the requesting entity.

Servicing application organization 140 may represent a single division or may have many divisions. The customer organization may be a membership organization that provides a variety of services to members. Servicing application organization 140 may contain a variety of servicing applications and includes customer database 150, customer preference database 160, data shareability rules 170, and compliance audit database 180. Servicing application organization 140 may be communicably coupled to the databases via an intranet or internet. Customer database 150 stores information about customers. Such information may be used in providing services to customers, such as customer 110. For example, customer database 150 may include information such as social security numbers, phone numbers, addresses, health care information, health history information, bank accounts, insurance, retirement accounts, mortgage information, credit scores, employment information, the name of family members, length of membership, annual salary, purchase history, and the like. Customer preference database 160 may store customer's preferences regarding the sharing and/or using of the data stored in customer database 150. The preferences may include both global preferences and transaction-by-transaction preferences. For example, customer 110 may have provided a global preference of "Opt-In," indicating that the customer has consented to sharing information. A global preference such as "Opt-Out" indicates that the customer has decided against allowing information to be shared. The global preferences may be overridden by transaction-by-transaction preferences when supported by customer consent.

Data shareability rules 170 specify how to determine whether data is shareable. These rules describe different kinds of data (e.g., vehicle data, financial asset, health-related data) and whether the data is shareable, optionally or potentially shareable, or prohibited from sharing. These rules are based on the regulation, law or contract that applies to the data, such as "FCRA" (Fair Credit Reporting Act). For example, data shareability rules 170 may include information that income data should be tagged with "FCRA," indicating that the FCRA applies, and "Optionally Shareable" indicating that income data may be shared with customer consent. The rules may also specify that the data is only available to the servicing application for the division that provided the data.

Compliance audit database 180 stores information demonstrating compliance with laws, regulations, and restrictions outlined in contracts. For example, compliance audit database 180 may store records regarding what information has been shared with which requesting entity at what time. Or compliance audit database 180 may store auditable templates demonstrating how the rules are applied to the data. Data sharing utility 190 accesses customer database 150, customer preference database 160, data shareability rules 170, and compliance audit database 180, and applies applicable regulations, laws, and restrictions outlined in contracts to determine whether the data may be accessed by a requesting entity.

In some embodiments, the customer database 150, customer preference database 160, data shareability rules 170, and compliance audit database 180 can be integrated into one database, or the information contained in the databases may be divided into various databases. A computer system associated with servicing application organization 140 or requesting entity 130 may be able to access these (and other) databases for account information, customer information, and other stored information.

Figure 2:
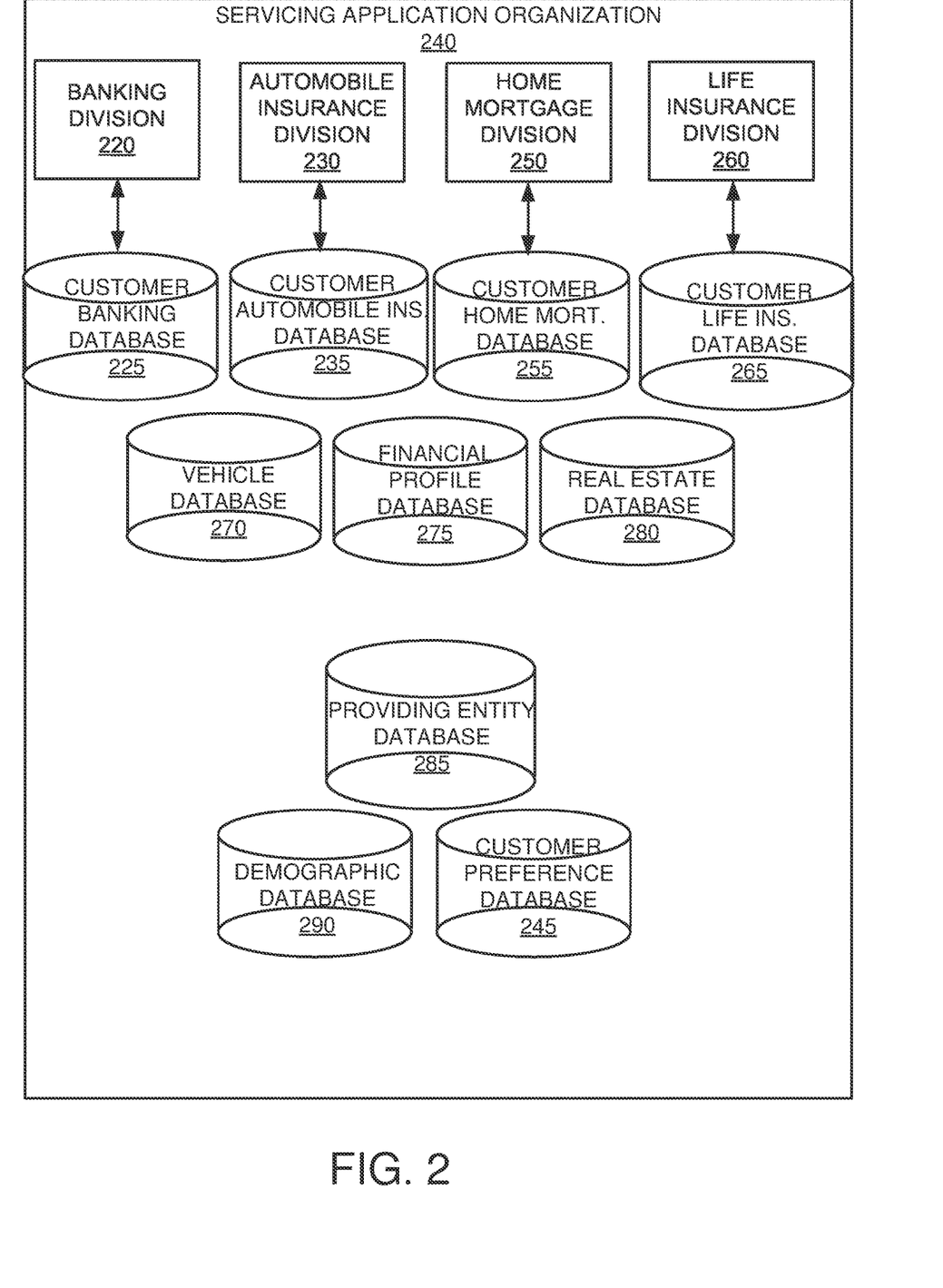
FIG. 2 illustrates an example of a servicing application organization in which some embodiments of the present invention may be utilized.

FIG. 2 is an embodiment of servicing application organization 140 of FIG. 1. In this embodiment, servicing application organization 240 may include servicing applications for many divisions or separate companies affiliated with it, such as banking division 220, automobile insurance division 230, home mortgage division 250, and life insurance division 260. Each division or company may have one or more databases that include customer information, such as customer banking database 225, customer automobile insurance database 235, customer home mortgage database 255, and customer life insurance database 265. Each database may include customer specific information that is particular to the types of transactions made in the division. For example, customer automobile insurance database 235 may include information about the type of vehicles the customer owns and the insurance coverages, limits, and deductibles; whereas, customer home mortgage database 255 may include information about the value of the home the customer owns, the interest rate of the mortgage, and payment plans. Each database may store customer preferences regarding sharing customer data or the servicing application organization 240 may have a centralized database that stores information regarding customer preferences in sharing data, such as customer preference database 245. A servicing application organization may also separate data from the division. For example, the vehicle database 270 is separated from the automobile insurance database 235. Similarly, a servicing application organization may have a financial profile database 275 and real estate database 280 separated from the home mortgage database 255. When the databases are separated, it may be necessary to record the providing entity in a providing entity database 285. Some embodiments may combine providing entity database 285 into vehicle database 270, financial profile database 275, and real estate database 280. Demographic database 290 may represent a customer's name, birthdate, gender, marital status, and so on.

Figure 3:
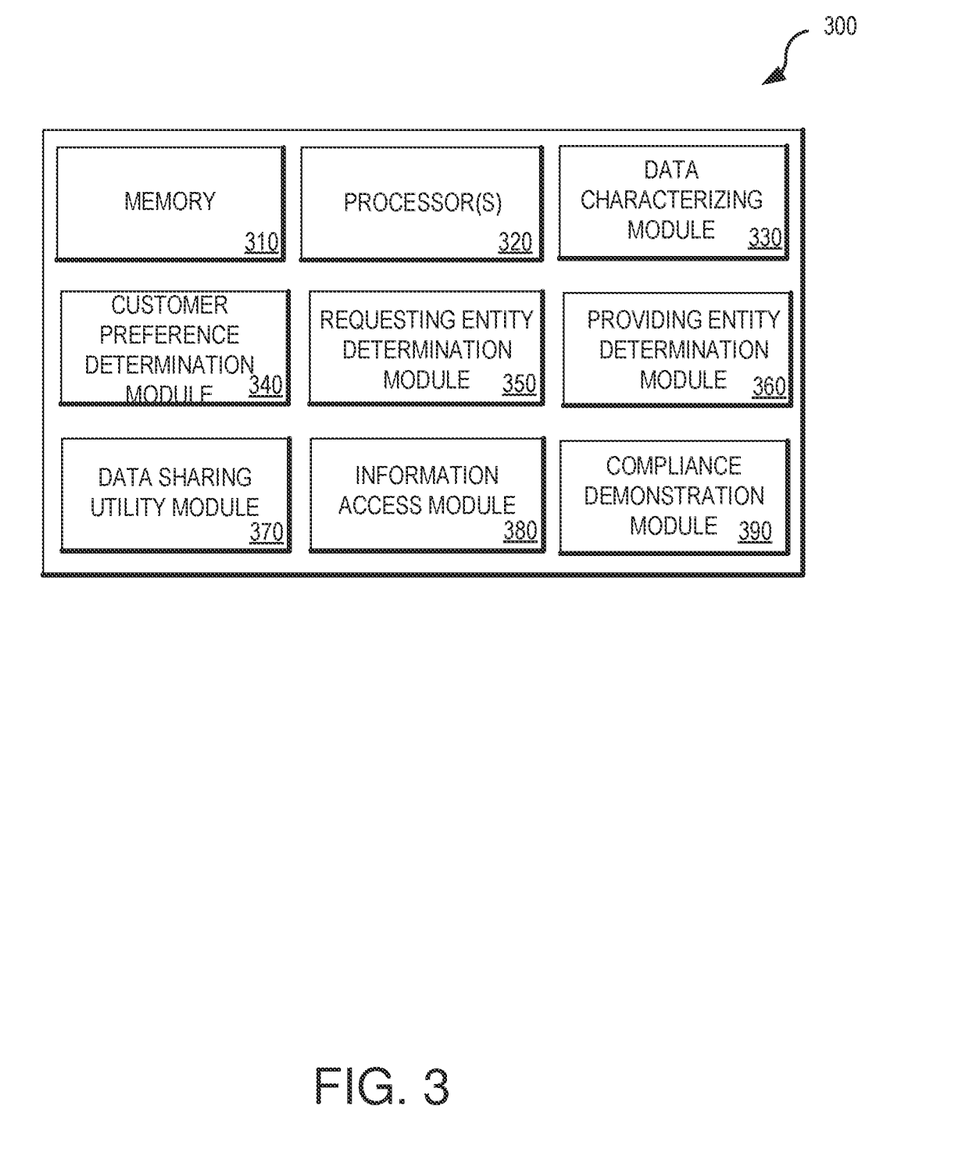
FIG. 3 is a block diagram illustrating components that can be included in a data access system in accordance with various embodiments of the present invention.

FIG. 3 is a block diagram illustrating components that can be included in a system such as system 100. According to the embodiments shown in FIG. 3, data access system 300 can include memory 310, one or more processors 320, data categorization module 330, customer preference determination module 340, requesting entity determination module 350, providing entity determination module 360, data sharing utility module 370, information access module 380, and compliance demonstration module 390. Other embodiments of the present invention may include some, all, or none of these modules and components along with other modules, applications, and/or components. Still yet, some embodiments may incorporate two or more of these modules into a single module and/or associate a portion of the functionality of one or more of these modules with a different module.

For example, in one embodiment, the functionality associated with data categorization module 330 and the customer preference determination module 340 can be incorporated into a single preference determination and categorizing module. In one embodiment, the data categorization module 330 can be separated into a data collection module to collect customer-specific data, a determination module to determine the type of data collected, and a tagging module to tag the data with applicable tags.

Memory 310 can be any device, mechanism, or populated data structure used for storing information. In accordance with some embodiments of the present invention, memory 310 can encompass any type of, but is not limited to, volatile memory, nonvolatile memory and dynamic memory. For example, memory 310 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 310 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 310.

Memory 310 may be used to store instructions for running one or more applications or modules on processor(s) 320. For example, memory 310 could be used in one or more embodiments to house all or some of the instructions needed to execute the functionality of data categorization module 330, customer preference determination module 340, requesting entity determination module 350, providing entity determination module 360, data sharing utility module 370, information access module 380, and compliance demonstration module 390.

Data categorization module 330 is configured to collect data from databases, such as customer database 150 and/or data shareability rules 170; determine the character of the data to be accessed; decompose complex data into multiple data items, and tag, classify, or otherwise provide an identifier in connection with the data according to its categorization. In some embodiments, it may be necessary to decompose a complex request for data into multiple data items due to the differences of shareability of each data item. For example, a consumer loan can contain terms of the contract, collateral information, customer demographic information, existing assets, and existing liabilities. Data categorization module 330 decomposes a request for consumer loan information into those data items.

Customer preference determination module 340 is configured to determine a customer's data sharing preference, if any. If the customer has not provided a sharing preference, a default preference may be used. Customer data sharing preference information may be stored in customer preference database 160. As described above, the customer may have made a preference of "Opt-In," "Opt-Out," or "No Opt-Out." In an example, if the preference is "Opt-In", then data evaluated as "optionally shareable" may be accessed by affiliates or third parties, depending upon the requesting entity, providing entity, and/or other circumstances. If the selection is to "Opt-Out," then sharing of optionally shareable data is prohibited without express consent from the customer. If the customer does consent to allowing the requesting entity to access the data in one circumstance, this decision may override the "Opt-Out" selection for that transaction. Or the customer may revoke their Opt-Out selection, allowing the requesting entity to access the data for all transactions. Either way, the override information will be recorded and stored in the customer preference database 160. Varying levels of Opt-Outs or Opt-Ins may be available to the customer. For example, the customer may consent to allowing some data to be shared with affiliates, but does not consent to sharing data with third parties.

Requesting entity determination module 350 is configured to determine the entity requesting the data. This determination may be used in evaluating whether data may be accessed by the requesting entity. The requesting entity may be determined based on a user making the request, a servicing application used in making the request, and/or an organizational entity associated with the request. Each of these may provide adequate information to determine the requesting entity. In other embodiments, additional information may be used in determining the requesting entity. The user may be a customer or an employee. The servicing application may be an on-line banking application used by a customer. The servicing application may be associated with a particular division or affiliate of the organization. The organizational entity may be a third party entity or an affiliated entity. For example, the requesting entity may be determined based on who within the organization is facilitating the transaction, the servicing application used, and/or the organizational entity associated with the request. The requesting entity may change depending upon the division an employee is representing. For example, if an employee (a user) is licensed or authorized to transact in both the banking and the home mortgage divisions of an organization, the servicing application used to make the request further assists in determining the requesting entity. Requesting entity determination module 350 may further determine whether the requesting entity has agreed to abide by certain data sharing policies.

The providing entity determination module 360 determines which entity provided the data that is stored and that is being requested. For example, if a customer enters the customer's income while applying for a home mortgage, the providing entity of the customer's income information is the home mortgage division. The providing entity may be based on the division associated with a particular database like the home mortgage database 255 associated with the Home Mortgage Division 250 in FIG. 2. It may also be recorded in a separate providing entity database 285. With FCRA (Fair Credit Reporting Act), if a customer "opts-out" from sharing "optionally shareable" data, the entity that provided the data may be the only entity allowed to access it. Thus, in this non-limiting example, the requesting entity must be the same entity as the providing entity or the data cannot be accessed.

Data sharing utility module 370 is configured to evaluate whether the requesting entity will be allowed to access the data by synthesizing the data item(s), customer preference information, requesting entity, providing entity, and applying a set or sets of rules. The evaluation is based on rules established by the organization based on these factors and the laws, regulations, and various contracts governing the sharing of data. The result of the rules will be a decision on whether the data can be accessed by the requesting entity. For example, if a rule for a financial asset shows that it is FCRA (Fair Credit Reporting Act) restricted data, its shareability is based on whether the customer's preference is "opt-out". If the preference is "opt-out", the data can only be accessed by the providing entity. Thus, the requesting entity must be determined to be the same as the providing entity (e.g., if the data was collected by a mortgage division, the requesting entity must be the mortgage division). Other data items may have rules that the data is never shareable. For example, if the data is subject to HIPAA (Health Insurance Portability and Accountability Act) Privacy Act, the rule may show that it is HIPAA restricted and never shareable with any requesting entity other than the providing entity.

Because there are numerous categorizations of data into data items, there may be numerous outcomes. A data request may result in all data, some of the data or none of the data being provided to the requesting entity via the information access module 380. Information access module 380 is configured to allow the requesting entity to access the data determined to be accessible by the data sharing utility module 370. The information access module 380 may further be configured to automatically process the data or load the data into an application in connection with a customer service. In an example, suppose a customer of a banking division is applying for a mortgage through a mortgage division. The requesting entity (determined by the mortgage division and/or employee and/or application) requests specific customer data such as a bank account balance from the banking division. If the data is determined to be accessible, the information access module 380 provides the requesting entity access to the data. The information access module 380 may collect the data and directly input the data into the customer's mortgage application. Thus, the representative of the organization will not be required to fill in duplicative information, creating efficiencies.

Compliance demonstration module 390 is configured to demonstrate that any access to customer information was in compliance with a particular set of rules. Compliance demonstration module 390 may access compliance audit database 180 to demonstrate the compliance using different methods. For example, compliance demonstration module 390 may display an auditable template of the code or business rules used in determining when data may be shared with which entities. In another example, compliance demonstration module 390 may provide a detailed message with each transaction including what data was shared with comments providing justifications.

Figure 4:
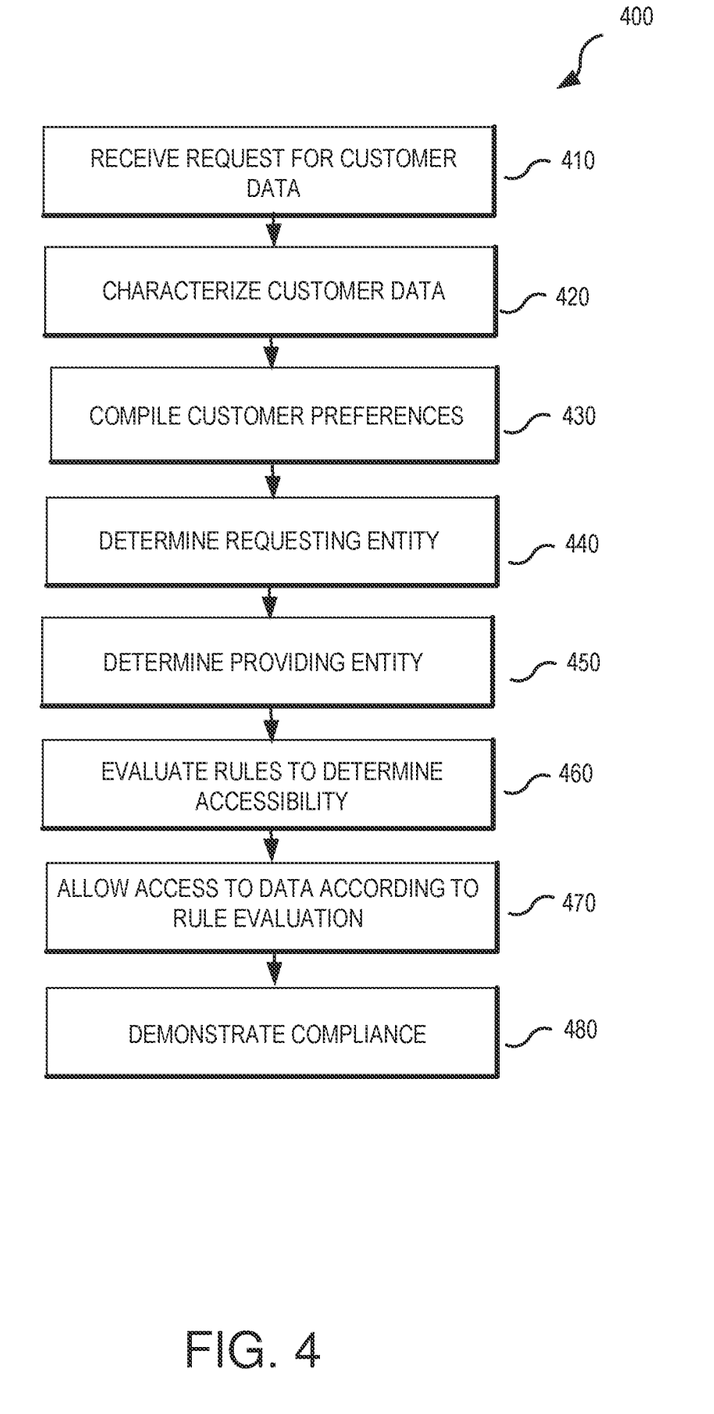
FIG. 4 is a flow chart illustrating a set of operations for allowing access to data in accordance with some embodiments of the present invention.

FIG. 4 is a flow chart illustrating a set of operations 400 for allowing access to data in accordance with some embodiments of the present invention. The steps or blocks may be performed in the operating environment 100 using one or more of the components described with respect to FIG. 3. In block 410, a request for customer data is received from a requesting entity 130. The customer data may have previously been provided to the servicing application organization 140. In block 420, the data is categorized, tagged or otherwise identified with respect to the type of data, such as by applicable legal rule or by shareable or sharing prohibited, as described above in the data categorization module 330. This step may include accessing data shareability rules 170. In block 430, the customer's preferences regarding data sharing are compiled. This may include accessing customer preferences database 160, and collecting and storing the customer's preferences. In block, 440, the requesting entity is determined. In block 450, the entity that provided the data is determined. This may be based on a database associated with a particular division or a database such as vehicle database 270 which may record the providing entity in the providing entity database 285. In block 460, rules are evaluated to determine whether the requesting entity will be allowed to access the data based on the data characteristics, customer data sharing preferences, the requesting entity, the providing entity, and the laws, regulations, and contracts governing the sharing of data. Thus, in block 470, the requesting entity is provided access to the data that is determined to be shareable. Finally, in block 480, compliance with the rules may be demonstrated by showing, for example, an auditable template.

Figure 5:
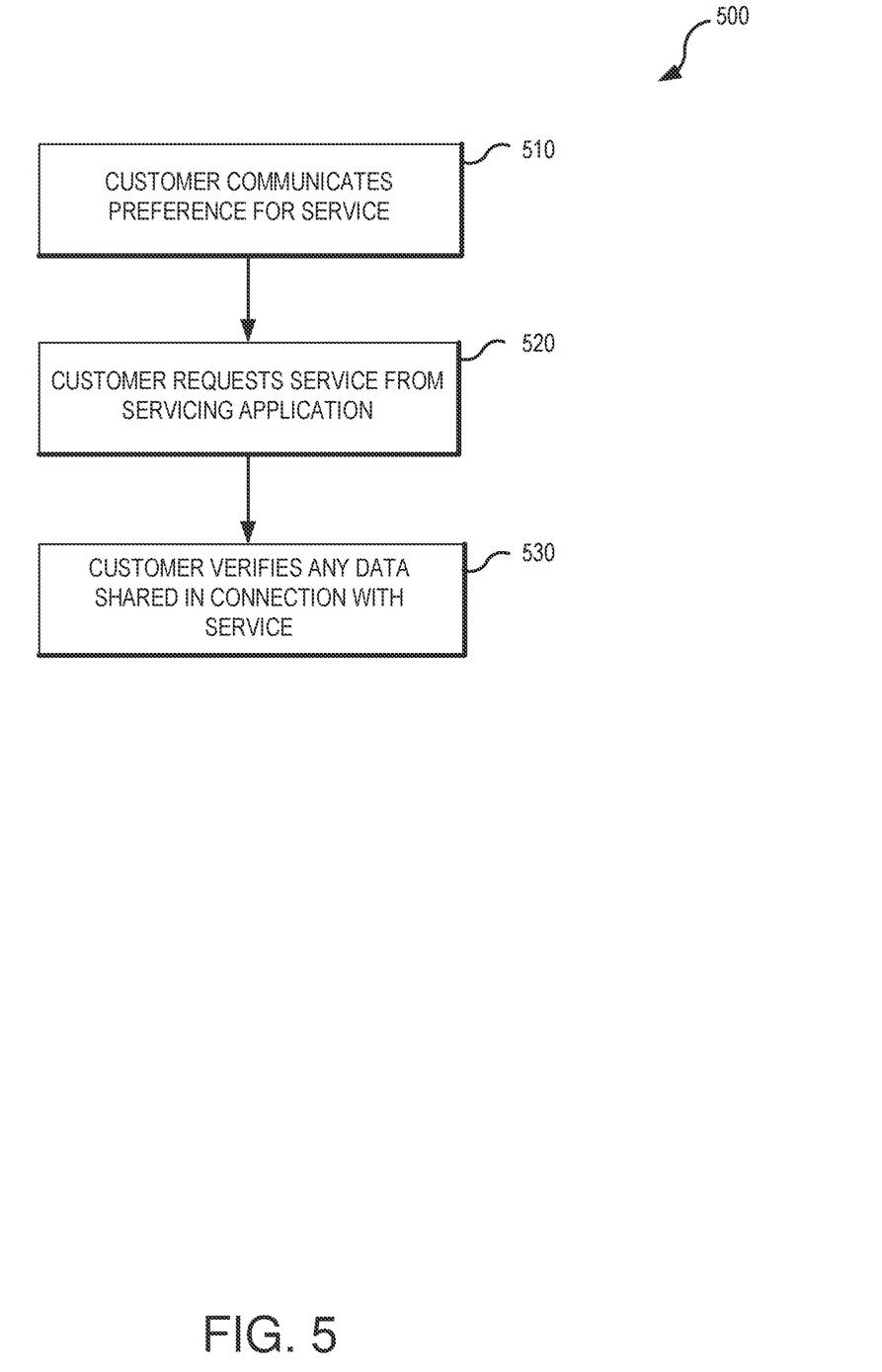
FIG. 5 is a flow chart illustrating a set of operations providing customer service when accessing data in accordance with some embodiments of the present invention.

FIG. 5 is a flow chart illustrating a set of operations 500 for providing customer service when accessing data in accordance with some embodiments of the present invention. FIG. 5 is an embodiment from a customer's perspective. In block 510, a customer 110 communicates preferences for service with the servicing application organization 140. For example, a customer may provide a sharing preference of "Opt-In" or "Opt-Out." Sometimes the preference may be a default after notice and an opportunity to Opt-Out have been provided. Next, in block 520, the customer requests service from a servicing application. For example, the customer may currently be a participating customer in the consumer loan division, but may wish to open a life insurance plan from the life insurance division's servicing application. In this case, the requesting entity is the life insurance division. If the life insurance division is allowed access to the data based on various factors such as the customer preferences, the data categorization, the requesting entity, and the processing entity, the life insurance division will be provided access to some or all of the data in the consumer loan division. Thus, some or all of the customer's consumer loan information may be automatically collected and input into the life insurance form. In block 530, the customer may be required to verify any data shared in connection with the service.

In some cases, a customer may have provided the same data in several instances and in several divisions of an organization. For example, the customer may have provided her income while filling out a mortgage statement and a financial plan. Thus, the customer organization may have two differing versions of data. In this case, the customer organization may recommend the most reliable data to the requesting entity. The reliability may be based upon the date the data was shared (the most recent is presumed to be the most accurate) or other information known about the customer, such as which source was supported by evidence such as a W2. The context in which the data was received may also be a reliability factor. For example, information received in applying for a mortgage will be given a higher reliability rating than information received in filling out a website survey.

Figure 6:
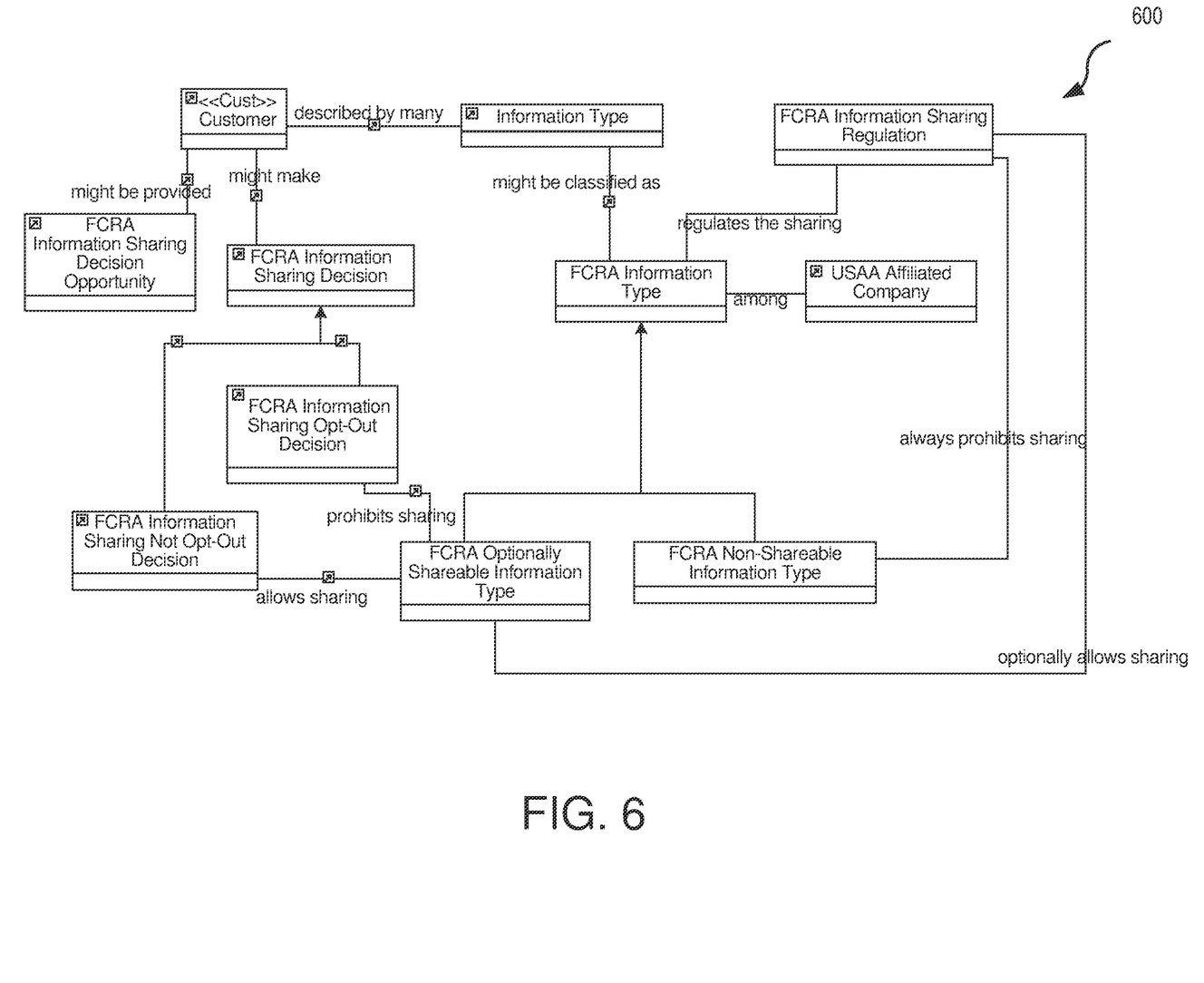
FIG. 6 is a class diagram illustrating class relationships for allowing access to data in accordance with some embodiments of the present invention.

FIG. 6 is a class diagram illustrating class relationships for allowing access to data in accordance with some embodiments of the present invention.

Computer System Overview

Figure 7:
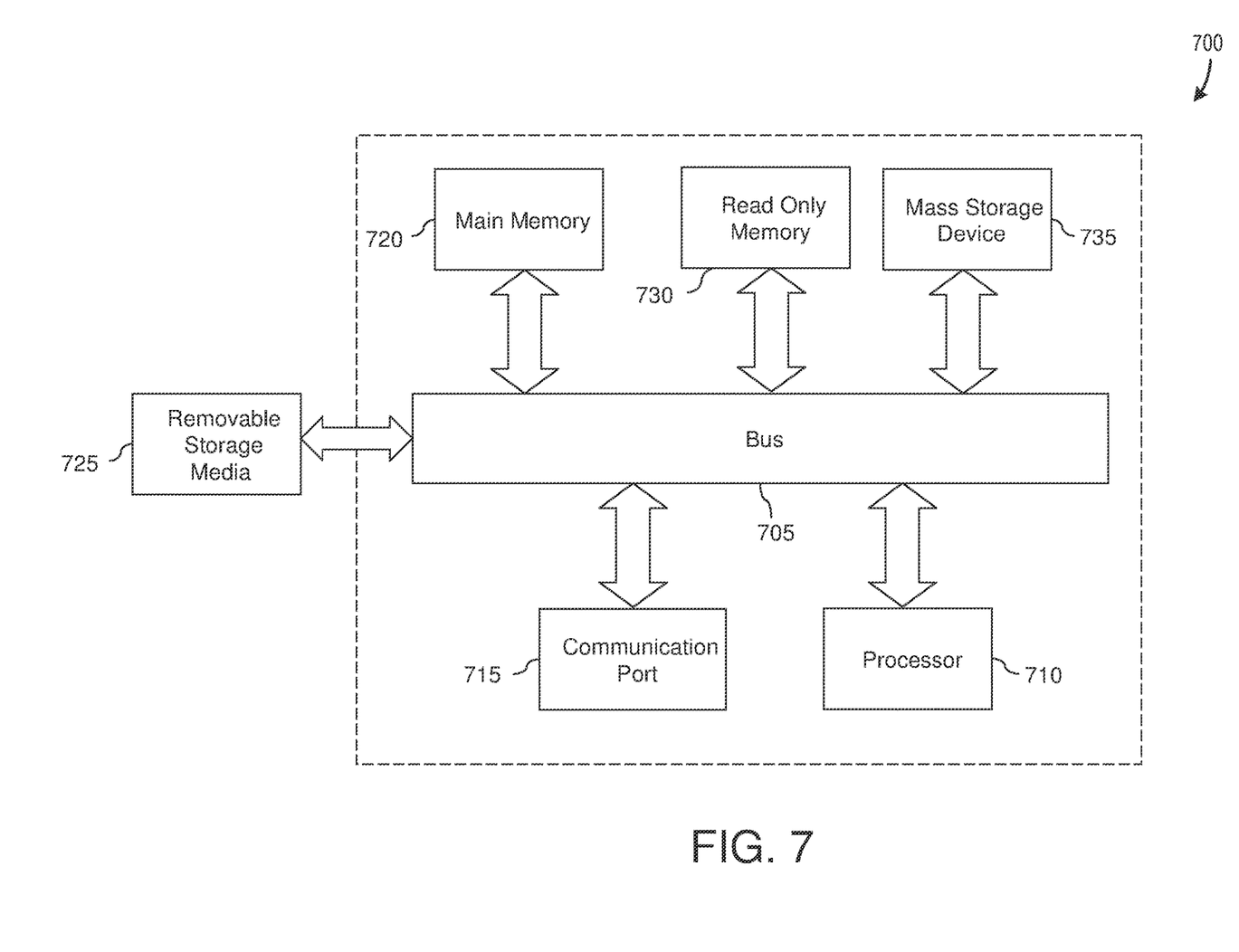
FIG. 7 illustrates an example of a computer system with which some embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present invention may be utilized. According to the present example, the computer system includes a bus 705, at least one processor 710, at least one communication port 715, a main memory 720, a removable storage media 725, a read only memory 730, and a mass storage 735.

Processor(s) 710 can be any known processor, such as, but not limited to, an Intel® Itanium® or Itanium 2® processor(s), or AMD® Opteron® or Athlon MP® processor(s), or Motorola® lines of processors. Communication port(s) 715 can be any of an RS-232 port for use with a modem based dialup connection, a 10/100 Ethernet port, or a Gigabit port using copper or fiber. Communication port(s) 715 may be chosen depending on a network such a Local Area Network (LAN), Wide Area Network (WAN), or any network to which the computer system 700 connects.

Main memory 720 can be Random Access Memory (RAM), or any other dynamic storage device(s) commonly known in the art. Read only memory 730 can be any static storage device(s) such as Programmable Read Only Memory (PROM) chips for storing static information such as instructions for processor 710.

Mass storage 735 can be used to store information and instructions. For example, hard disks such as the Adaptec® family of SCSI drives, an optical disc, an array of disks such as RAID, such as the Adaptec family of RAID drives, or any other mass storage devices may be used.

Bus 705 communicatively couples processor(s) 710 with the other memory, storage and communication blocks. Bus 705 can be a PCI/PCI-X or SCSI based system bus depending on the storage devices used.

Removable storage media 725 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "responsive" includes completely or partially responsive.

The term "module" refers broadly to software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "affiliated entity" refers to any entity that directly or indirectly, legally or beneficially, owns, is owned, or is under common ownership with an organization's ultimate parent. Affiliated entities also refer to separate divisions within the same organization.

The term "third party entity" refers to any entity that is not an affiliated entity.

The term "organizational entity" refers to any entity (includes both affiliated and third party entities).

The term "network" generally refers to a group of interconnected devices capable of exchanging information. A network may be as few as several personal computers on a Local Area Network (LAN) or as large as the Internet, a worldwide network of computers. As used herein "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

For the sake of illustration, various embodiments of the present invention have herein been described in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the disclosure provides novel systems, methods and arrangements for systems and methods for allowing other entities to access data in compliance with laws, regulations, business standards, and contractual obligations. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A method comprising:
receiving, by a first computing system, a request for electronic access to a data item associated with a second user from a second computing system;
determining rule sharing restrictions based on whether the requested data item is subject to one or more rule-based data sharing restrictions;
determining that the requested data item is electronically shareable with the second computing system based on A) the rule sharing restrictions, and B) an identity of a providing entity that is holder of the requested data item, and C) an identity of the second user associated with the second computing system that is requesting the electronic access;
in response to determining that the requested data item is electronically shareable with the second computing system: providing, to the second computing system, the electronic access to the requested data item; and
transmitting a message to a first user indicating the electronic access was provided and at least one basis for providing the electronic access to the second computing system, wherein the at least one basis includes at least one of A) the rule sharing restrictions, B) the identity of the providing entity, or C) the identity of the second user.

2. The method of claim 1, further comprising:
in response to the requested data item being subject to user preference data sharing restrictions:
requesting consent to share the requested data item from the first user; and
in response to receiving the consent, providing, to the second computing system, the electronic access to the requested data item.

3. The method of claim 1, further comprising:
receiving, by the first computing system, a request for electronic access to a second data item associated with the second user from the second computing system;
determining rule sharing restrictions based on whether the requested second data item is subject to the one or more rule-based data sharing restrictions;
determining user preference sharing restrictions based on whether the requested second data item is subject to one or more user preference data sharing restrictions; and
in response to the requested second data item being not shareable based on the rule sharing restrictions and the one or more user preference data sharing restrictions, denying the request for the electronic access to the second data item.

4. The method of claim 1, further comprising:
in response to user preference data sharing restrictions being unavailable, using default user preference data sharing restrictions.

5. The method of claim 1, further comprising:
locating two differing versions of the requested data item; and
selecting one of the two differing versions of the requested data item based on a context in which the requested data item was received.

6. The method of claim 1, further comprising:
determining the identity of the second user.

7. The method of claim 1, wherein the requested data item is not subject to user preference sharing restrictions where the first user has opted into sharing the requested data item.

8. A non-transitory computer-readable medium storing instructions that, when executed by a computing system, cause the computing system to perform operations comprising:
receiving, by a first computing system, a request for electronic access to a data item associated with a second user from a second computing system;
determining rule sharing restrictions based on whether the requested data item is subject to one or more rule-based data sharing restrictions;
determining that the requested data item is electronically shareable with the second computing system based on A) the rule sharing restrictions, and B) an identity of a providing entity that is holder of the requested data item, and C) an identity of the second user associated with the second computing system that is requesting the electronic access;
in response to determining that the requested data item is electronically shareable with the second computing system: providing, to the second computing system, the electronic access to the requested data item; and
transmitting a message to a first user indicating the electronic access was provided and at least one basis for providing the electronic access to the second computing system, wherein the at least one basis includes at least one of A) the rule sharing restrictions, B) the identity of the providing entity, or C) the identity of the second user.

9. The non-transitory computer-readable medium of claim 8, wherein the operations further comprise:
in response to the requested data item being subject to user preference data sharing restrictions:
requesting consent to share the requested data item from the first user; and
in response to receiving the consent, providing, to the second computing system, the electronic access to the requested data item.

10. The non-transitory computer-readable medium of claim 8, wherein the operations further comprise:
receiving, by the first computing system, a request for electronic access to a second data item associated with the second user from the second computing system;
determining rule sharing restrictions based on whether the requested second data item is subject to the one or more rule-based data sharing restrictions;
determining user preference sharing restrictions based on whether the requested second data item is subject to one or more user preference data sharing restrictions; and
in response to the requested second data item being not shareable based on the rule sharing restrictions and the one or more user preference data sharing restrictions, denying the request for the electronic access to the second data item.

11. The non-transitory computer-readable medium of claim 8, wherein the operations further comprise:
in response to user preference data sharing restrictions being unavailable, using default user preference data sharing restrictions.

12. The non-transitory computer-readable medium of claim 8, wherein the operations further comprise:
locating two differing versions of the requested data item; and
selecting one of the two differing versions of the requested data item based on a context in which the requested data item was received.

13. The non-transitory computer-readable medium of claim 8, wherein the operations further comprise:
determining the identity of the second user.

14. The non-transitory computer-readable medium of claim 8, wherein the requested data item is not subject to user preference sharing restrictions where the first user has opted into sharing the requested data item.

15. A system comprising:
one or more processors; and
one or more memories storing instructions that, when executed by the one or more processors, cause the system to perform a process comprising:
receiving, by a first computing system, a request for electronic access to a data item associated with a second user from a second computing system;
determining rule sharing restrictions based on whether the requested data item is subject to one or more rule-based data sharing restrictions;
determining that the requested data item is electronically shareable with the second computing system based on A) the rule sharing restrictions, and B) an identity of a providing entity that is holder of the requested data item, and C) an identity of the second user associated with the second computing system that is requesting the electronic access;

in response to determining that the requested data item is electronically shareable with the second computing system: providing, to the second computing system, the electronic access to the requested data item; and transmitting a message to a first user indicating the electronic access was provided and at least one basis for providing the electronic access to the second computing system, wherein the at least one basis includes at least one of A) the rule sharing restrictions, B) the identity of the providing entity, or C) the identity of the second user.

16. The system according to claim 15, wherein the process further comprises:

in response to the requested data item being subject to user preference data sharing restrictions:

requesting consent to share the requested data item from the first user; and in response to receiving the consent, providing, to the second computing system, the electronic access to the requested data item.

17. The system according to claim 15, wherein the process further comprises:

receiving, by the first computing system, a request for electronic access to a second data item associated with the second user from the second computing system;

determining rule sharing restrictions based on whether the requested second data item is subject to the one or more rule-based data sharing restrictions;

determining user preference sharing restrictions based on whether the requested second data item is subject to one or more user preference data sharing restrictions; and in response to the requested second data item being not shareable based on the rule sharing restrictions and the one or more user preference data sharing restrictions, denying the request for the electronic access to the second data item.

18. The system according to claim 15, wherein the process further comprises:

in response to user preference data sharing restrictions being unavailable, using default user preference data sharing restrictions.

19. The system according to claim 15, wherein the process further comprises:

locating two differing versions of the requested data item; and selecting one of the two differing versions of the requested data item based on a context in which the requested data item was received.

20. The system according to claim 15, wherein the requested data item is not subject to user preference sharing restrictions where the first user has opted into sharing the requested data item.

* * * * *